United States Patent [19]
Miller et al.

[11] Patent Number: 5,903,114
[45] Date of Patent: May 11, 1999

[54] MULTI-FUNCTIONAL APPARATUS EMPLOYING AN INTERMITTENT MOTION MECHANISM

[75] Inventors: Robin Mihekun Miller, Ellington, Conn.; William C. Zimmer, Columbus, Miss.; James W. Gibson, Steens, Miss.; Eric J. Krupp, Canton, Mich.

[73] Assignee: UT Automotive Dearborn, Inc., Dearborn, Mich.

[21] Appl. No.: 08/947,971

[22] Filed: Oct. 9, 1997

Related U.S. Application Data

[63] Continuation-in-part of application No. 08/430,388, Apr. 28, 1995.

[51] Int. Cl.⁶ .................................................... H02K 7/10
[52] U.S. Cl. ............................ 318/10; 318/14; 318/280; 74/84 R; 74/436; 74/665 B; 15/250.22; 292/197; 292/201; 292/140
[58] Field of Search .................................. 74/84 R, 436, 74/665 B; 318/9–15, 280–282, 286; 292/195–197, 199–201, 138–144, DIG. 3; 15/250.22, 250.27, 250.28, 250.29, 250.3

[56] References Cited

U.S. PATENT DOCUMENTS

| | | |
|---|---|---|
| 2,271,207 | 1/1942 | Rhein . |
| 2,345,778 | 4/1944 | Lammeren et al. . |
| 2,615,945 | 10/1952 | Jaeschke . |

(List continued on next page.)

FOREIGN PATENT DOCUMENTS

| | | |
|---|---|---|
| 0 345 002 A2 | 6/1989 | European Pat. Off. . |
| 1281424 | 12/1961 | France . |
| 822 178 | 11/1951 | Germany . |
| 28 16 207 A1 | 10/1979 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 4/1993 | Japan . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

Patent Abstracts of Japan, vol. 016, 7–438 (M–1309), Sep. 11, 1992 for JP Patent Publication No. 04151351.
P. 100, *Machine Design*, 60 (1988) Oct. 13, No. 24, Cleveland, Ohio US.
"Goodheart–Wilcox Automotive Encyclopedia", William K. Toboldt, Larry Johnson, Steven W. Olive, 1989, pp. 723–727.
"Automotive Handbook", Bosch 3rd Edition, 1993, pp. 694–697.
"Kinematic Analysis of Mechanisms", 1959, J.E. Shigley, pp. 228–231.

*Primary Examiner*—Brian Sircus
*Attorney, Agent, or Firm*—Harness, Dickey & Pierce, P.L.C.

[57] ABSTRACT

A multi-functional apparatus employs a power transmission mechanism for generating intermittent motion having a specific range of motion and angular velocity profile for selectively actuating a mechanical device operably coupled to the power transmission mechanism. An electromagnetic device selectively causes movement of the power transmission mechanism. In another aspect of the present invention, a single electric motor selectively actuates a plurality of intermittent rotary motion mechanisms thereby causing separate mechanical devices coupled thereto to operate within an automotive vehicle.

43 Claims, 5 Drawing Sheets

U.S. PATENT DOCUMENTS

| | | |
|---|---|---|
| 2,659,237 | 11/1953 | Wood . |
| 2,722,617 | 11/1955 | Cluwen et al. . |
| 2,953,802 | 9/1960 | Ziegler . |
| 2,959,803 | 11/1960 | Ziegler . |
| 3,163,791 | 12/1964 | Carlson . |
| 3,361,005 | 1/1968 | Carpenter . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,516,610 | 6/1970 | Stevens . |
| 3,523,204 | 8/1970 | Rand . |
| 3,574,882 | 4/1971 | Petry . |
| 3,619,676 | 11/1971 | Kawakami . |
| 3,659,128 | 4/1972 | Danek . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,705,520 | 12/1972 | Carpenter ................................. 74/600 |
| 3,803,627 | 4/1974 | Schuscheng . |
| 3,858,922 | 1/1975 | Yamanaka . |
| 3,917,330 | 11/1975 | Quantz . |
| 3,927,436 | 12/1975 | Inoue et al. . |
| 4,009,952 | 3/1977 | Badalich et al. . |
| 4,065,234 | 12/1977 | Yoshiyuki et al. . |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,450,390 | 5/1984 | Andrei-Alexandru et al. . |
| 4,478,004 | 10/1984 | Andrei-Alexandru et al. . |
| 4,492,904 | 1/1985 | Graham . |
| 4,507,711 | 3/1985 | Ono et al. . |
| 4,553,656 | 11/1985 | Lense . |
| 4,573,723 | 3/1986 | Morita et al. . |
| 4,630,178 | 12/1986 | Mugford et al. . |
| 4,639,065 | 1/1987 | Kohler et al. . |
| 4,660,698 | 4/1987 | Miura . |
| 4,663,575 | 5/1987 | Juzswik et al. . |
| 4,674,781 | 6/1987 | Reece et al. . |
| 4,701,972 | 10/1987 | Saito ................................. 15/250.22 |
| 4,702,117 | 10/1987 | Tsutsumi et al. . |
| 4,724,760 | 2/1988 | Bubley ................................. 101/115 |
| 4,733,147 | 3/1988 | Muller et al. . |
| 4,793,640 | 12/1988 | Stewart, Sr. ........................... 292/201 |
| 4,875,053 | 10/1989 | Harada . |
| 4,878,398 | 11/1989 | Heinrich . |
| 4,885,512 | 12/1989 | Gille et al. . |
| 4,893,039 | 1/1990 | Isii . |
| 4,897,842 | 1/1990 | Herz et al. . |
| 4,918,272 | 4/1990 | Nishikawa . |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,119,523 | 6/1992 | Unterborn . |
| 5,182,957 | 2/1993 | Bohmer et al. . |
| 5,214,440 | 5/1993 | Takahashi et al. . |
| 5,218,255 | 6/1993 | Horiguchi . |
| 5,222,775 | 6/1993 | Kato . |
| 5,226,200 | 7/1993 | Buchanan, Jr. et al. . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,315,735 | 5/1994 | I-Shin . |
| 5,333,351 | 8/1994 | Sato . |
| 5,355,061 | 10/1994 | Forhan . |
| 5,355,286 | 10/1994 | Flint . |
| 5,373,605 | 12/1994 | Austin . |
| 5,427,345 | 6/1995 | Yamakami et al. . |
| 5,440,186 | 8/1995 | Forsell et al. . |
| 5,462,337 | 10/1995 | Yamakami . |
| 5,485,044 | 1/1996 | Mackay et al. . |
| 5,519,258 | 5/1996 | Stroven et al. . |
| 5,528,959 | 6/1996 | Yamakami . |
| 5,654,617 | 8/1997 | Mills . |
| 5,691,586 | 11/1997 | Yonnet et al. . |
| 5,694,012 | 12/1997 | Plentka et al. . |
| 5,694,812 | 12/1997 | Maue et al. . |
| 5,730,028 | 3/1998 | Maue et al. . |
| 5,844,382 | 12/1998 | Dan . |

OTHER PUBLICATIONS

"Genevamation Indexing Drives", Jan. 12, 1995 Catalog No 693, Geneva Mechanisms Corporation.

"Saab 900 Owners Workshop Manual", Haynes Publishing Group, 1979 through 1985, pp. 172–174, 237.

Machine Design, "Basics of Design Engineering", Jun. 1992, Article "Mechanical System".

A paper from the Third Conference on Mechanisms, "A Survey of Intermittent–Motion", F.J.Bogardus, 1956, pp. 8–15.

Machine Design, "Mechanisms for Intermittent Motion", Dec. 1951, Otto Lichtwitz, pp. 134–148.

"Mechanisms for Providing Intermittent Rotary Motion", Product Engineering, Aug. 1949, pp. 116–117.

Machine Design, Mechanisms for Intermittent Motion, "Part 2", Jan. 1952, Otto Lichtwitz, pp. 127–141.

Machine Design, Mechanisms for Intermittent Motion, "Part 3", Feb. 1952, Otto Lichtwitz, pp. 146–155.

Machine Design, Mechanisms for Intermittent Motion, "Part 4", Mar. 1952, Otto Lichtwitz, pp. 147–155.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

Exhibit A—(UTA 26 Gate Wiper Motor), prior to Oct. 9, 1997.

Exhibit B—(1996 Ford Windstar Wiper Motor), prior to Oct. 9, 1997.

Exhibit C—(1996 Chevy Blazer Wiper Motor), prior to Oct. 9, 1997.

Exhibit D—(1996 Honda Civic Rear Unidirectional Wiper Motor), prior to Oct. 9, 1997.

Exhibit E—(1996 Toyota Direct Drive Unidirectional Wiper Motor), prior to Oct. 9, 1997.

Exhibit F—(1996 Honda Civic Wiper Motor), prior to Oct. 9, 1997.

Exhibit G—(Wiper Motor), prior to Oct. 9, 1997.

Exhibit H—(Wiper Motor), prior to Oct. 9, 1997.

A paper from the Third Conference on Mechanisms, "Designing for Intermittent Motion with Modified Starwheels", Karl E. Kist, pp. 116–120, prior to Apr. 1995.

"Mechanisms for Engineering Design", "Motion, Circular, Intermittent", Chapter 3, S.B. Tuttle, John Wiley Co., pp. 33–51, prior to Apr. 1995.

MULTI-FUNCTIONAL APPARATUS EMPLOYING AN INTERMITTENT MOTION MECHANISM

CROSS REFERENCE TO RELATED APPLICATIONS

This application is a continuation-in-part of U.S. application Ser. No. 08/430,388, filed Apr. 28, 1995 entitled "Multi-Functional Apparatus Employing An Intermittent Motion Mechanism" by James Wayne Gibson and William C. Zimmer.

BACKGROUND OF THE INVENTION

This invention relates generally to multi-functional apparatuses and specifically to a multi-functional apparatus employing an intermittent motion mechanism for use in an automotive vehicle.

Almost all automotive vehicles have a single or a pair of windshield wiper assemblies. These assemblies traditionally include rubber wiper blades mounted upon claw brackets. These claw brackets are attached to wiper arms mounted upon rotating shafts. These shafts are either directly driven by electric motors or driven by a single electric motor which actuates series or parallel-coupled four-bar linkage mechanisms. It is further known to provide a wiper system, in combination with a wash device, to clean headlamps for automotive vehicles.

It is also common to employ a window wiper assembly for cleaning rear windows of automotive vehicles. Typically, these types of rear window wiper assemblies include a wiper blade mounted upon a bracket which is coupled to a wiper arm. The wiper arm is attached to a wiper shaft rotatably driven in a cyclical oscillating manner by a helical gear. A reversible, fractional horsepower, dc electric motor serves to actuate the helical gear through an armature shaft-mounted worm gear enmeshed therewith. This type of rear window wiper arrangement is usually mounted upon a pivoting liftgate of a minivan, station wagon, sport-utility vehicle or the like. Examples of conventional window wiper assemblies and motor mechanisms are disclosed with the following U.S. Patents: U.S. Pat. No. 4,893,039 entitled "Windshield Wiper Motor" which issued to Isii on Jan. 9, 1990; U.S. Pat. No. 4,878,398 entitled "Driving Device for Window Wiper of Motor Vehicles" which issued to Heinrich on Nov. 7, 1989; U.S. Pat. No. 4,336,482 entitled "Rear Window Wiper Motor Control" which issued to Goertler et al. on Jun. 22, 1982; U.S. Pat. No. 4,259,624 entitled "Arrangement for Wiping a Vehicle Window" which issued to Seibicke on Mar. 31, 1981; U.S. Pat. No. 3,694,723 entitled "Motor Vehicle Windshield Wiper Having a Parking Position Outside the Wiper Area" which issued to Schneider et al. on Sep. 26, 1972; and, U.S. Pat. No. 3,665,772 entitled "Windshield Wiper Motor Link Depressed Park Mechanism" which issued to Beard et al. on May 30, 1972. All of these patents are incorporated by reference herewithin.

Some conventional vehicles also provide a rear window release lock or latch, actuated by a solenoid, which can be unlocked to allow for upward pivotal movement of the rear window in relation to the otherwise stationary liftgate. In combination therewith, a separate liftgate lock is often mounted upon the liftgate door for fastening the liftgate to the body to prevent inadvertent pivotal opening. This liftgate lock is traditionally operated by manual key or handle rotation, or through a separate electric motor or solenoid.

SUMMARY OF THE INVENTION

In accordance with the present invention, the preferred embodiment of a multi-functional apparatus employs an intermittent motion mechanism. An electromagnetic device selectively causes movement of the intermittent motion mechanism thereby moving a mechanical device coupled thereto. In another aspect of the present invention a pair of intermittent rotary motion mechanisms are selectively rotated by a single reversible electric motor. In a further aspect of the present invention, a single electric motor selectively actuates three intermittent rotary motion mechanisms thereby causing three mechanical devices coupled thereto to operate. In a further aspect of the present invention, a single unidirectional electric motor is operably coupled to an intermittent rotary motion mechanism to provide intermittent oscillating motion.

The multi-functional apparatus of the present invention is advantageous over conventional systems since the present invention combines many different functions into a single apparatus. For example, the multi-functional apparatus of the present invention replaces the traditional separate rear wiper motor, liftgate lock motor and rear window lock solenoid. Accordingly, the multi-functional apparatus of the present invention significantly reduces the piece cost, assembly cost, part proliferation and handling costs, wiring costs, and battery current consumption as compared to conventional constructions. Furthermore, the multi-functional apparatus of the present invention significantly reduces weight and packaging space requirements while increasing the electrical and mechanical reliability of the affected systems. Objectional motor and solenoid noises are also reduced. Moreover, the present invention provides a means for mechanically locking the intermittent motion mechanisms and devices coupled thereto in fixed positions. Additional advantages and features of the present invention will become apparent from the following description and appended claims, taken in conjunction with the accompanying drawings.

DETAILED DESCRIPTION OF THE PREFERRED EMBODIMENT

Figure 1:
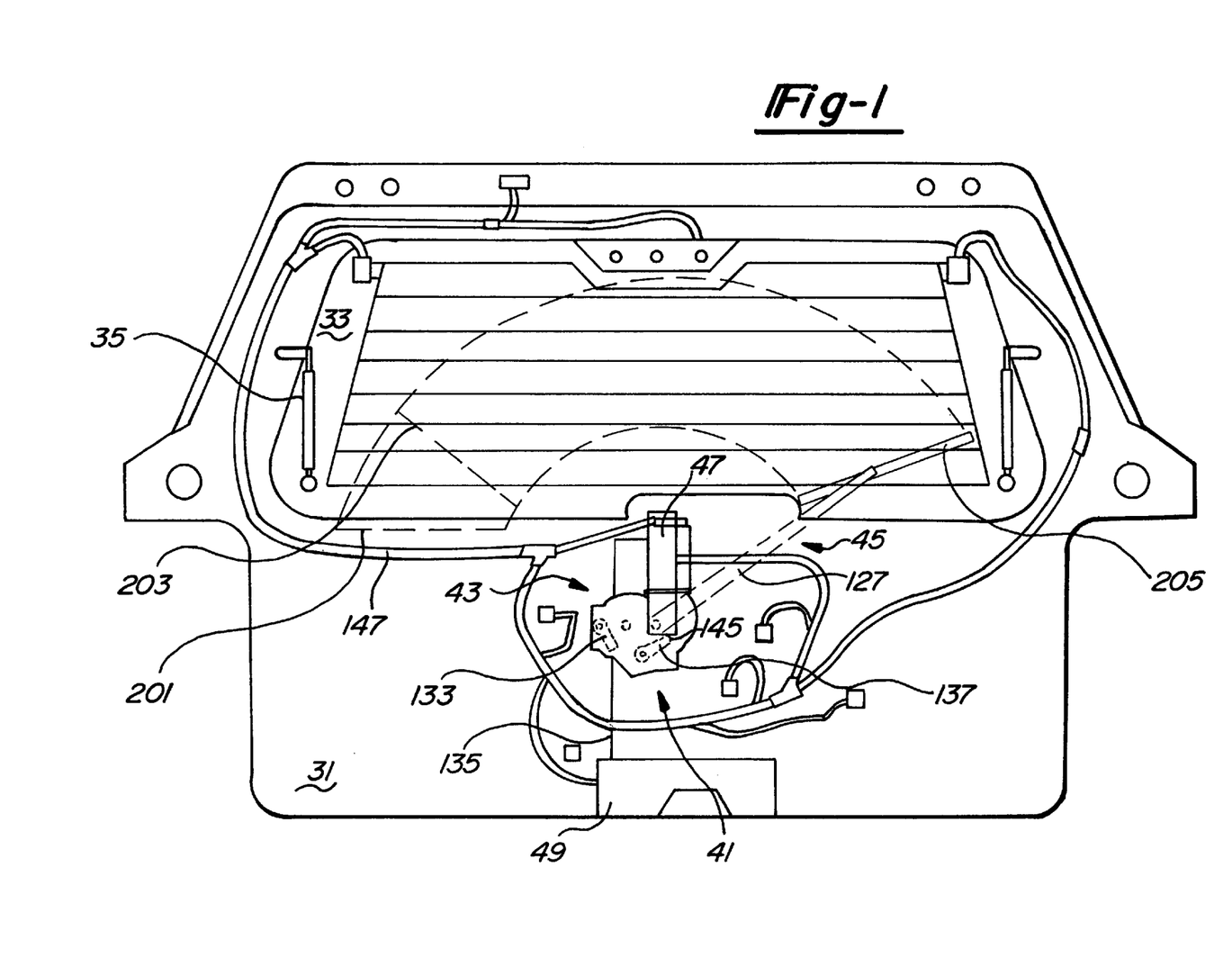
FIG. 1 is a front elevational view showing the preferred embodiment of a multi-functional apparatus of the present invention in a rear liftgate environment.

An automotive vehicle, such as a minivan or the like, has a rear liftgate door which can pivot about an upper pair of hinges coupled to the vehicle body structure. When the liftgate is pivoted to an open position, a cargo space is accessible from behind the vehicle. Such a liftgate is shown in FIG. 1. Liftgate 31 has a rear window or backlite 33 pivotable between a closed position, substantially flush with the outer surface of liftgate 31, to an open position about upper hinges. A pair of pneumatic cylinders 35 act to push window 33 toward the open position when a lower portion of window 33 is released. The preferred embodiment of a multi-functional apparatus 41 of the present invention is mounted upon an inner surface of liftgate 31. The majority of apparatus 41 is hidden by an interior trim panel (not shown). Apparatus 41 includes a central drive and power transmission unit 43, a window wiper assembly 45, a window release latch or lock 47 and a liftgate release latch or lock 49, all of which are mounted upon liftgate 31. Examples of such locks (employing separate solenoids or motors, which would be removed in order to couple the lock mechanism for use with the present invention) are disclosed within the following U.S. patents: U.S. Pat. No. 5,222,775 entitled "Power Operated Latch Device for Automotive Back Door" which issued to Kato on Jun. 29, 1993; U.S. Pat. No. 4,422,522 entitled "Inertial Lock for Vehicle Door Latch" which issued to Slavin et al. on Dec. 27, 1983; and, U.S. Pat. No. 3,917,330 entitled "Electric Lock Release" which issued to Quantz on Nov. 4, 1975; all of which are incorporated by reference herewithin.

The present invention represents improvements to the multi-functional apparatus disclosed in U.S. application Ser. No. 08/430,388 entitled "Multi-Functional Apparatus Employing An Intermittent Motion Mechanism" filed Apr. 28, 1995 by Zimmer et al. which is commonly owned by the assignee of the present invention and the disclosure of which is expressly incorporated by reference herein.

Generally, the present invention incorporates modifications to central drive and power transmission unit 43 to provide the desired output therefrom for performing multi-functional operations. More specifically, central drive and power transmission unit 43 is adapted to include an output linkage for directly driving a component of the automotive vehicle, such as window release latch 47 without the use of additional coupling members or linkages. Central drive and power transmission unit 43 may be further adapted to include a modified cam mechanism for driving window wiper assembly 45 such that a pair of geneva mechanisms operate at the beginning and end of the cycle to smoothly accelerate and decelerate window wiper assembly 45, while a sector gear mechanism is utilized to provide a constant angular speed during an intermediate range of the wiper assembly motion. Central drive and power transmission unit 43 may be further adapted to include an extended portion on the cam operatively associated with window wiper assembly 45 to generate an initial large rotary motion for parking and unparking window wiper assembly 45 with respect to glass 33. Central drive and power transmission unit 43 may be further adapted to include a cam member having a dual function such that two operations, e.g. releasing window release lock 47 and releasing liftgate release lock 49, can be performed by a single cam member. Alternatively, central drive and power transmission unit 43 may be adapted to include a linked double geneva mechanism for providing oscillating motion to drive window wiper assembly 45 with a single unidirectional motor assembly.

Figure 2:
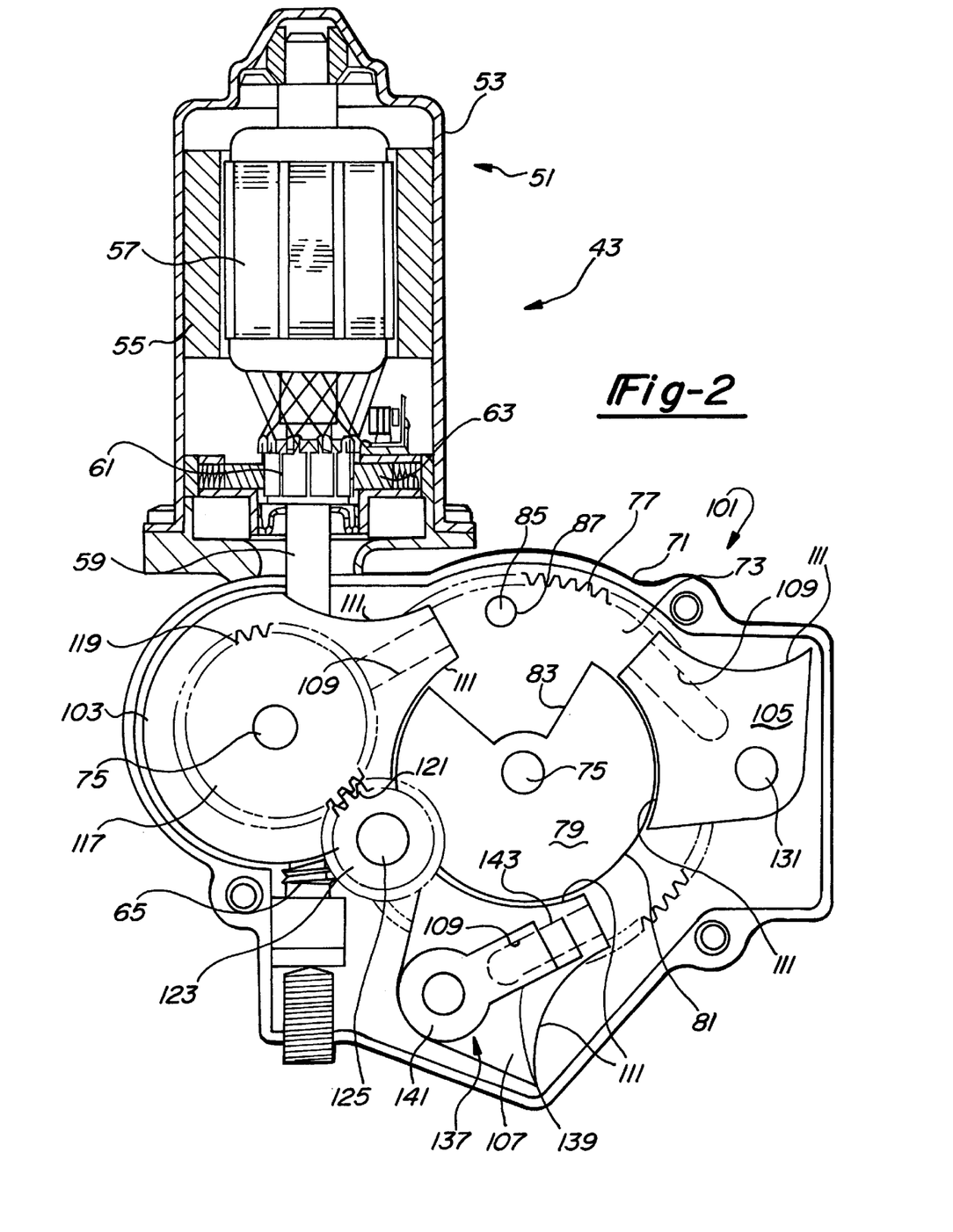
FIG. 2 is a rear elevational view, with portions broken away therefrom, showing a preferred embodiment of the multi-functional apparatus of the present invention.

With reference now to FIG. 2, central drive and power transmission unit 43 includes an electric motor 51 which is of a conventional 12-volt fractional horsepower, dc electromagnetic variety having a metallic motor housing 53 within which are stationary permanent magnets 55, a rotatable armature 57 with wire windings, a rotatable armature shaft 59 joined to armature 57, a commutator 61 electrically connected to the wire windings and rotatable with armature shaft 59, a brush card assembly 63 and various electronic components, bushings and retainers. It will be appreciated to those skilled in the art that other electric motor constructions can readily be substituted for that shown. A worm gear segment 65 is provided upon a portion of armature shaft 59 extending beyond motor housing 53.

A gear housing 71 is also provided for receiving worm gear segment 65 and the immediately adjacent portions of armature shaft 59. A main helical gear 73 is also housed and rotatably journalled within gear housing 71. Gear housing 71 is preferably made from cast aluminum. A plurality of knurled steel journalling pins 75 are press fit or otherwise attached within machined openings of gear housing 71. The placement of these openings in relation to each other is important. Pins 75 can alternately be molded as part of plastic gears and cams.

Helical gear 73 has an external set of helically oriented teeth 77 projecting entirely therearound for meshing with worm gear segment 65. A geneva wheel or drum 79 is mounted upon a face of helical gear 73 for rotation therewith. Drum 79 has a partially circular peripheral surface 81 interrupted by a clearance indentation 83. Drum 79 and helical gear 73 are coaxially aligned for rotation about their respective journalling pin 75. A drive pin 85 projects from a face of helical gear 73 substantially parallel to the adjacent journalling pin 75. As presently preferred, drive pin 85 has a cylindrical driving interface surface 87 thereabout. Alternately, a rotatable sleeve may surround drive pin 85. Other alternate driving interface means may be employed such as an integrally molded finger, screw, rivet, spring, rib, plural projections or other similar formations protruding from a face or peripheral portion of helical gear 73. Helical gear 73 is preferably injection molded from a polymeric material such as acetyl.

A power transmission assembly 101 of central drive and power transmission unit 43 employs three geneva mechanisms or cams 103, 105 and 107 for providing intermittent rotary motion. Each cam has a single, linear, external open channel 109 defined by driven interfacing surfaces or walls therein. Driving interface surface 87 of drive pin 85 is selectively engageable against the walls defining channels 109 of each cam. Each cam is rotatable about its respective journalling pin 75. Furthermore, partially circular external surfaces 111 of each cam register with the partially circular peripheral surface 81 of drum 79. A relatively tight tolerance on these registering surfaces of about half a thousandth of an inch is preferably used. Thus, unless each cam is aligned with indentation 83 of drum 79, partially circular peripheral surface 81 of drum 79 will act to prevent rotation of each cam, thus making power transmission unit non-back drivable. However, when indentation 83 of drum 79 aligns with an individual cam, concurrently with drive pin 85 engaging within a channel 109 of the same cam, continued rotation of helical gear 73 will cause the selectively coupled cam to rotate therewith. Moreover, the selectively coupled cam will have increased rotational acceleration as drive pin 85 moves closer to journalling pin 75 within channel 109. This rotational acceleration, then deceleration, achieves a desirable velocity profile such that potentially harmful inertial stresses and cyclical fatigue within the device coupled thereto are avoided. The diameter of drive pin 85 should match channel 109 width within half a thousandth of an inch.

Cam 103 additionally has a spur gear 117 stacked coaxially thereupon for simultaneous movement therewith. Spur gear 117 has a peripheral set of teeth 119 extending entirely therearound for enmeshing with a mating external set of teeth 121 extending entirely around a driven pinion gear 123. Pinion gear 123 rotates the window wiper shaft 125 which extends from a rear face of pinion gear 123 and moves in concert therewith. Wiper shaft 125 is attached to pinion gear 123 through rivets, insert molding, knurled press fitting, et cetera. A window wiper arm 127 (FIG. 1) of wiper assembly 45 is mounted upon wiper shaft 125 in a conventional manner. Wiper shaft is preferably made from cold rolled steel. The system is designed to oscillate wiper assembly 45 with a range of approximately 160° and at forty-five cycles per minute (round trip) but other ranges and cycle frequencies can be achieved. The cams, spur gear and pinion gear are preferably made from powdered metallic steel.

A protuberance 131 projects from a rear face of cam 105 and engages with a lever 133 which, in turn, is attached to a liftgate lock rod 135 (FIG. 1). Protuberance 131, lever 133 and rod 135 are also considered to be lock couplings or coupling members. Lock connecting rod 135 is joined to liftgate lock 49 (see FIG. 1) for causing the mechanisms therein to move in response to movement of cam 105. Protuberance 131 is preferably secured to their respective levers 133 and 139 in a keyholed manner. Additional threaded nuts, push nuts, crimpings, cotter pins and washers or the like (not shown) may be employed to retain the levers to their protrusions. An output link 137 is stacked coaxially upon cam 107 for simultaneous movement therewith. A lever 139 extends radially outwardly from cylindrical portion 141 and has shoulder portion 143 formed thereon. A liftgate window release 145 (FIG. 1) of liftgate window release lock 47 directly engages shoulder portion 143 for causing window releasing movement thereof in response to selective movement of cam 107. Alternately, other coupling means may be employed such as cables, belts, chains, gear sets, multiple linkages, jack screws, rack and pinion gear sets or the like may be employed for operably coupling power transmission assembly 101 with iiftgate window release lock 47 and liftgate window release lock 49.

Wiring harness 147 (FIG. 1) electrically connects central drive and power transmission unit 43 to an electronic control unit (not shown). A more detailed description of a preferred control system for the multi-functional apparatus of the present invention is disclosed in U.S. application Ser. No. 08/431,149 entitled "Control System For An Automotive Vehicle Multi-Functional Apparatus" filed Apr. 28, 1995 by Maue et al. which is commonly owned by the assignee of the present invention and the disclosure of which is expressly incorporated by reference herein.

The operation of the multi-functional apparatus of the present invention will now be described. Initially, the wiper blade of window wiper assembly 45 is positioned in a depressed park position, designated as position 201, off of window 33. Electric motor 51 is energized to rotate worm gear 65 such that helical gear 73 is rotated in a clockwise direction, as shown in FIG. 2, to move the wiper blade approximately 6° from the depressed park position 201 to the beginning of the window wipe range designated as position 203. Electric motor 51 is further energized such that helical gear 73, drive pin 85, cam 103, spur gear 117 and pinion gear 123 are rotated to cause window wiper assembly 45 to traverse its path to completion position designated as position 205 at the end of the window wipe range. The electrical polarity to motor 51 is then reversed such that rotatoon of helical gear 73, drive pin 85, cam 103, spur gear 117 and pinion gear 123 are reversed back to the beginning of the window wipe range designated as position 203. Window wiper assembly 45 is driven in this manner when window wiping motion is desired. Upon termination of the window wiping motion, helical gear 73 is further rotated by worm gear 65 such that drive pin 85 moves cam 103, spur gear 117 and pinion gear 123 to the depressed park position 201. The wiper blade is thus moved off of window 33 such that the wiper blade is supported on a bracket upon the lftgate door. This allows for non-interfered movement of liftglass window 33.

As previously described, central drive and power transmission unit 43 further operates to lock and unlock iiftgate 31 and window 33. More specifically, helical gear 73 and drive pin 85 are rotated in a clockwise direction, as shown in FIG. 2, causing drive pin 85 to engage channel 109 such that cam 105 moves to an unlocked orientation thereby causing the coupling and liftgate lock 49 associated therewith to also be moved from a locked orientation to an unlocked orientation. Motor 51 can then be reversed to move helical gear 73 in a counter-clockwise direction causing drive pin 85, cam 105 and liftgate release lock 49 to move from an unlocked orientation to an locked orientation.

Similarly, helical gear 73 and drive pin 85 can be rotated past cam 105 in a clockwise direction to engage cam 107 such that output link 137 actuates window release lock 47 from a locked orientation to an unlocked orientation. Motor 51 is then energized to rotate helical gear 73 in a counter-clockwise direction thereby returning window release lock 47 to the locked position.

Figures 3, 4:
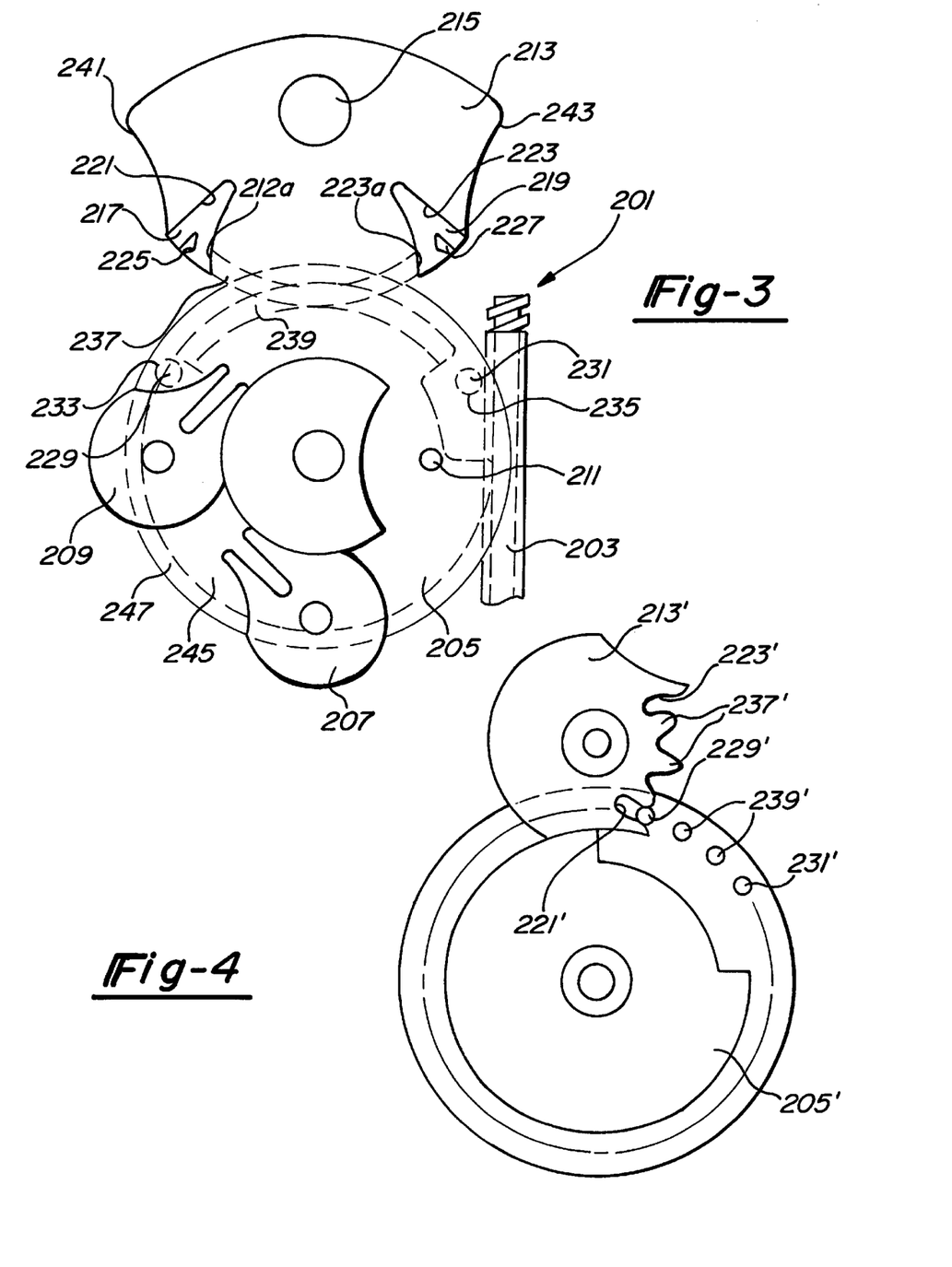
FIG. 3 is a diagrammatic rear elevational view showing a power transmission mechanism employing a geneva/gear mechanism to generate oscillating motion for the window wiper assembly with a single reversible drive motor.
FIG. 4 is a diagrammatic rear elevational view showing a power transmission mechanism utilizing a star wheel mechanism to generate oscillating motion for the window wiper assembly with a single reversible drive motor.

With reference now to FIG. 3, a first alternate embodiment of the multi-functional apparatus of the present invention is partially shown which utilizes a modified geneva mechanism in place of cam 103 illustrated in FIG. 2. More specifically, cam 103 is a good mechanism for generating sinusoidal motion based on a limited range of rotation, i.e., less than or equal to 90°, of helical gear 73. While the rotational output motion generated by cam 103 can be exended by utilizing a multiple pin geneva mechanism, the output velocity profile, which varies as a function of multiple velocity sine waves separated by a zero velocity period, is adversely effected. Preferably the velocity output profile includes an acceleration range, a constant speed range, and a deceleration range. The modified geneva mechanism illustrated in FIG. 3 provides this preferred velocity output profile, thereby enabling the use of a smaller, higher speed drive motor to operate wiper assembly 45.

Power transmission mechanism 201 includes cam 213 having a sector gear portion 237 operably disposed between a pair of geneva mechanisms 217, 219 to provide a wiper output having an increasing velocity period, a sustained constant velocity period, and decreasing velocity period. More specifically, worm gear 203 engages a complementary set of teeth formed on helical gear 205 for rotation in a manner heretofore described. Cams 207, 209 are operably positioned about helical gear 205 and selectively engage pin 211 extending from a face of helical gear 205 to operate the liftgate release lock and the liftgate window release lock, respectively. Power transmission mechanism 201 further includes cam 213 pivotably coupled to the housing for rotary motion by journalling pin 215. Cam 213 has a pair of external open channels 217, 219, the side wall of which form outer guide surfaces defining driven surfaces 221, 223. Inner guide surfaces 225, 227 are formed within channels 217, 219 to further define driven surfaces 221, 223 and provide means for preventing overspeeding and back driving of cam 213. Driven surface 221, 223 is formed with a tapered trailing portion 221a and driven surface 223 is formed with a tapered leading portion 223a which provide a smooth transition between channels 217, 219 and sector gear portion 237. A wiper shaft of wiper assembly 45 is operably coupled to cam 213 to oscillate a wiper blade in the preferred manner.

A pair of drive pins 229, 231 project from a back of helical gear 205 and have a cylindrical driving interface surface 233, 235 formed thereon. In this regard, drive pin 229 is operable to engage driven surface 221 for rotating cam 213 in response to rotation of helical gear 205. Similarly, drive pin 231 is operable to engage driven surface 223 for further rotating cam 213 in response to rotation of to helical gear 205. Cam 213 further includes pinion gear sector 237 formed between channel 217 and channel 219. A complementary sector gear 239 is coaxially stacked on a back surface of helical gear 205 for simultaneous rotation therewith to operably couple cam 213 with helical gear 205.

Partially circular external surfaces 241, 243 are formed on cam 213 and register with the partially circular peripheral surface 247 formed on drum 245. A relatively tight tolerance on these registering surfaces is preferably used such that cam 213 is non-backdrivable unless appropriately positioned with respect to helical gear 205.

The operation of the multi-functional apparatus of the present invention illustrated in FIG. 3 will now be described. Worm gear 203 exends from a motor assembly (not shown) to drive helical gear 205 in a manner heretofore described when helical gear 205 is rotated in a clockwise direction. Drive pin 211 engages cams 207, 209 for operating the liftgate release lock and the liftgate window release lock as heretofore described. To operate window wiper assembly 45, helical gear 205 is rotated in a counter-clockwise direction, as illustrated in FIG. 3, such that drive pin 229 engages driven surface 221 causing cam 213 to gradually accelerate in a clockwise direction. As helical gear 205 continues to rotate, drive pin 231 traverses tapered portion 221a of interface surface 221 and smoothly transfers drive of cam 213 from pin 231 to sector gear 239. Sector gear 239 drives cam 213 at a substantially constant velocity rate through the range of sector gears 237, 239. At the end of the sector gear range, drive pin 231 engages interface surface 219 to gradually decelerate cam 213. Thus, the geneva mechanisms employed by cam 213 are used for gradual acceleration and deceleration at the end of the wiper cycle, whereas the gear sector portions are utilized for a substantially constant velocity profile during the middle of the wiper motion. This system creates a simple, inexpensive method of creating a low stress system in which the motor assembly is not required to provide the acceleration and deceleration ranges.

With reference now to FIG. 4, a second alternate embodiment of the multi-functional apparatus of the present invention is partially shown which utilizes a star wheel mechanism in place of cam 103 illustrated in FIG. 2. More specifically, star wheel 213' is employed to provide oscillatory motion for a wiper assembly in a manner similar to cam 213 illustrated in FIG. 3. Helical gear 205' has a plurality of pins 229', 231', 239' extending from a face thereof which operably engage a portion of star wheel 213'. More specifically, channel portions 221', 223' are formed within star wheel 213'. A plurality of teeth 237' are formed on star wheel 213' in between channel 221' and channel 223'. During operation, helical gear 205' rotates in a counter-clockwise direction such that drive pin 229' engages channel 221' to provide an accelerating angular velocity of star wheel 213'. As helical gear 205' continues to rotate, guide pins 239' engage teeth 237' to provide a substantially constant angular velocity profile of star wheel 213'. At the end of its cycle, drive pin 231' engages channel 223' to provide a decelerating angular velocity of star wheel 213'. Oscillating motion is achieved by counter-rotating helical gear 205' in a clockwise direction. In this manner, star wheel 213' provides the desirable velocity profile for driving an intermittent wiper assembly.

Figure 5:
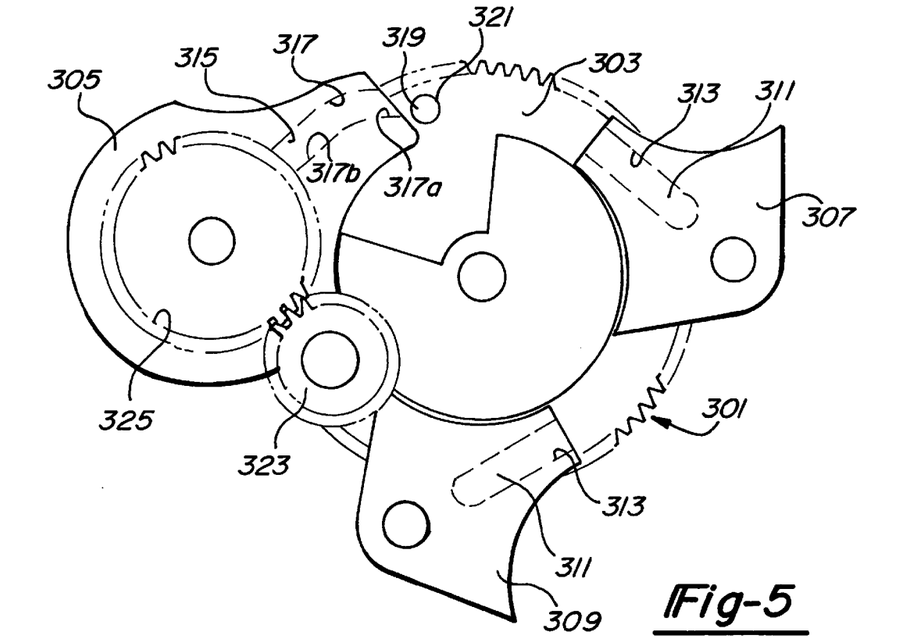
FIG. 5 is a diagrammatic rear view showing a power transmission mechanism having a geneva extension formed on a geneva mechanism to provide an extended range of motion to appropriately position a window wiper assembly in a parked position with a single reversible drive motor.

With reference now to FIG. 5, a third alternate embodiment of the multi-functional apparatus of the present invention is partially shown which utilizes a geneva mechanism having a curved extension formed on an end thereof for providing a large rotary motion to park wiper assembly 46. As previously described, in a rear liftgate wiper application, the wiper should be parked off of the glass when not in use. A typical geneva mechanism cannot accommodate the extended motion at the end of the travel to "park" the wiper without sacrificing the range of rotating motion thereof. Additionally, the smooth acceleration profile of a geneva mechanism is compromised by this limited range causing additional stress and wear on associated components. As such, the range of motion from the geneva mechanism is limited such that insufficient motion is left for parking the wiper. Accordingly, a preferred geneva mechanism is adapted which employs an extended, curved end portion having a high drive ratio such that a large, initial rotary motion is generated in response to a small rotary input from the drive motor to unpark the wiper. The wiping action of the system is generated by the straight portion of the geneva system such that smooth, even motion is realized during wiping. Upon shut off of the system, the geneva mechanism is rotated further through the curved portion, thereby rotating the wiper rapidly off of the glass to a parked position. In this manner, a geneva mechanism can be utilized to provide a large rotary motion followed by a smooth sinusoidal motion.

Power transmission assembly 301 includes helical gear 303 and geneva mechanisms or cams 305, 307 and 309. Cams 307 and 309 have a single linear external open channel 311 defined by driven interfacing surface 313 formed therein. Similarly, cam 305 has a single external open channel 315 defining a non-linear driven interface surface 317 therein. More specifically, driven interfacing surface 317 has a first curved portion 317a extending inwardly from an end thereof. A second portion 317b extends inwardly from said first curved portion 317a. First portion 317a is curved to provide a first angular orientation with respect to cam 305. Second portion 317b is substantially linear to provide a second angular orientation with respect to cam 305. Power transmission assembly 301 further includes a drive pin 319 projecting from a face of helical gear 303 and having a cylindrical driving interface surface 321 formed thereabout. Cams 307, 309 cooperate with drive pin 319 extending from helical gear 303 to respectively operate a liftgate release lock and a liftgate window release lock in a manner heretofore described.

Cam 305 operably couples helical gear 303 with pinion gear 323 through spur gear 325 to drive window wiper assembly 45. As helical gear 303 rotates in a counter-clockwise direction, drive pin 319 engages channel 315 such that driving surface 321 engages driven surface 317. More specifically, driving surface 321 initially engages curved portion 317a to rotatably couple helical gear 303 to cam 305 at a first drive ratio for providing a large rotary motion to move wiper assembly 45 from a parked position illustrated as position 201 in FIG. 1, to the beginning of the window wipe range illustrated as position 203 in FIG. 1. Once in this location, drive pin 319 reciprocates within channel 315 as helical gear 305 is intermittently driven in a counter-clockwise, then clockwise manner such that driving surface 321 engages substantially straight portion 317b to rotatably couple helical gear 303 to cam 305 at a second drive ratio for providing the oscillating range of sinusoidal motion heretofore described. Preferably, the second gear ratio is less than the first gear ratio to achieve the desired velocity profile. Upon deactivation, helical gear 305 is further rotated in a clockwise direction such that drive pin 319 is positioned out of engagement from straight portion 317b and into engagement with curved portion 317a to reposition the wiper assembly in the parked position. In this manner, cam 305 is able to initially provide a large, substantially non-linear range of motion followed by an oscillating sinusoidal range of motion.

Figure 6:
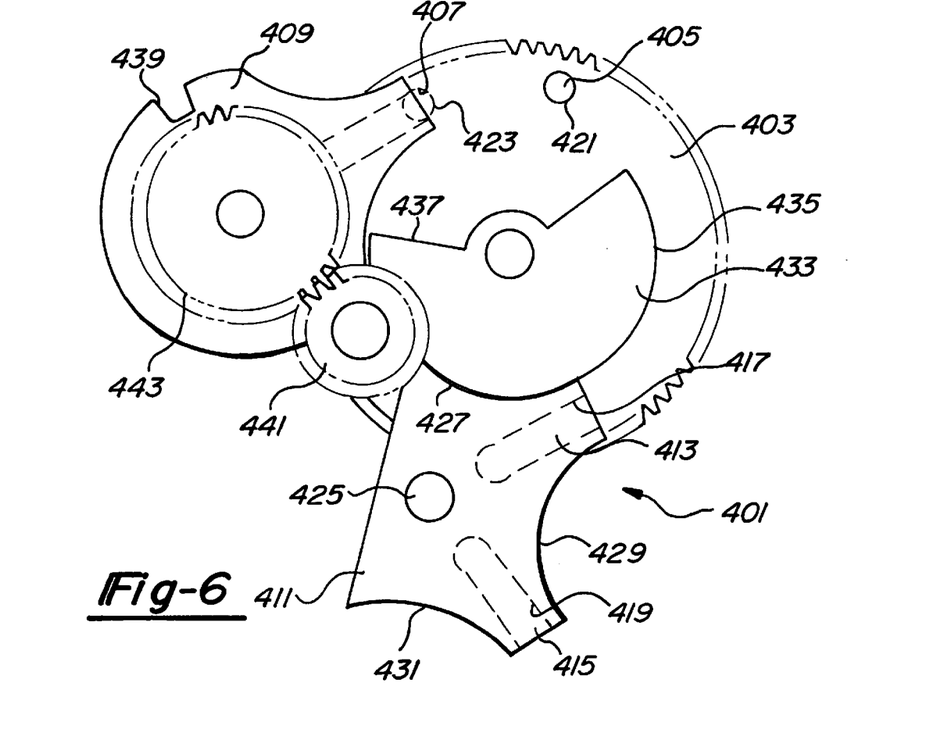
FIG. 6 is a diagrammatic rear elevational view showing a power transmission mechanism utilizing a dual-function geneva mechanism to perform multi-functional operations with a single reversible drive motor.

With reference now to FIG. 6, a fourth alternate embodiment of the multi-functional apparatus of the present invention is partially shown which provides means for generating multiple outputs from a single cam member. In a rear tailgate application, this would allow for additional functions to be operated by the power transmission mechanism 401 or alternately reduce the cost of the system by eliminating the number of components associated therewith.

Power transmission mechanism 401 includes helical gear 403 rotatably driven by a worm gear associated with the motor assembly as heretofore described. A first drive pin 405 and a second drive pin 407 project from a face of helical gear 403. Power transmission mechanism 401 further employs a pair of geneva mechanisms or cams 409 and 411. Cam 409 is similar to cam 103 illustrated in FIGS. 1 and 2 and previously described herein for operably coupling wiper assembly 45 to motor assembly 51. Cam 409 further includes a relief 439 formed in a peripheral edge thereof for providing clearance for pin 405 as helical gear 403 is rotated in a counter-clockwise direction. Cam 409 operably couples helical gear 403 with pinion gear 441 through spur gear 443 to drive wiper assembly 45.

Cam 411 has a first linear external open channel 413 and a second linear external open channel 415 formed therein to define driven interface surfaces 417, 419, respectively. Driving interface surface 421 formed on drive pin 405 is selectively engageable with driven interface surface 417 of first channel 413 to rotate cam 411 about journal pin 425. Similarly, driving interface surface 423 of drive pin 407 is selectively engageable with driven interface surface 419 of second channel 415 for further rotating cam 411 about journalling pin 425. Partially circular external surfaces 427, 429, 431 are formed on cam 411 and cooperate with partially circular peripheral surface 435 formed on drum 433 to prevent power transmission assembly 401 from being back driven. Indentation 437 is formed in drum 433 such that cam 411 will rotate about journalling pin 425 when aligned with indentation 437.

Cam 411 is operably coupled to a liftgate lock release and a liftgate window lock release through a protuberance which projects from a rear face of cam 411 in a manner similar to that heretofore described. One skilled in the art will recognize that cam 411 may be operably coupled to other automotive components for selective operation thereof.

In operation, power transmission assembly 401 functions to operate an intermittent wiper assembly, a rear liftgate lock release and a rear liftgate window lock release. In the wiper drive mode, helical gear 403 is rotated in a counter-clockwise direction such that pin 407 engages cam 409 to operably drive the window wiper assembly in an oscillating manner as heretofore described. To operate the liftgate lock release, helical gear 403 is rotated in a clockwise direction such that pin 405 engages channel 413 causing cam 411 to rotatably position in a counter-clockwise direction from a first position where external surface 427 faces inwardly toward helical gear 403 to a second position where external surface 429 faces inwardly toward helical gear 403 such that coupling members for the lock assembly cause the mechanism therein to release the liftgate lock release. Further rotation of helical gear 403 in the clockwise direction causes pin 407 to engage channel 415 resulting in further counter-clockwise rotation of cam 411 from the second position to a third position where external surface 431 faces inwardy toward helical gear 403. This further rotational movement manipulates coupling members of the liftgate window lock release to unlatch the window glass. Once the window glass lock is released, helical gear 403 is rotated in a counter-clockwise direction, thereby causing cam 411 to rotate in a clockwise direction and return toward its initial position.

Figure 7:
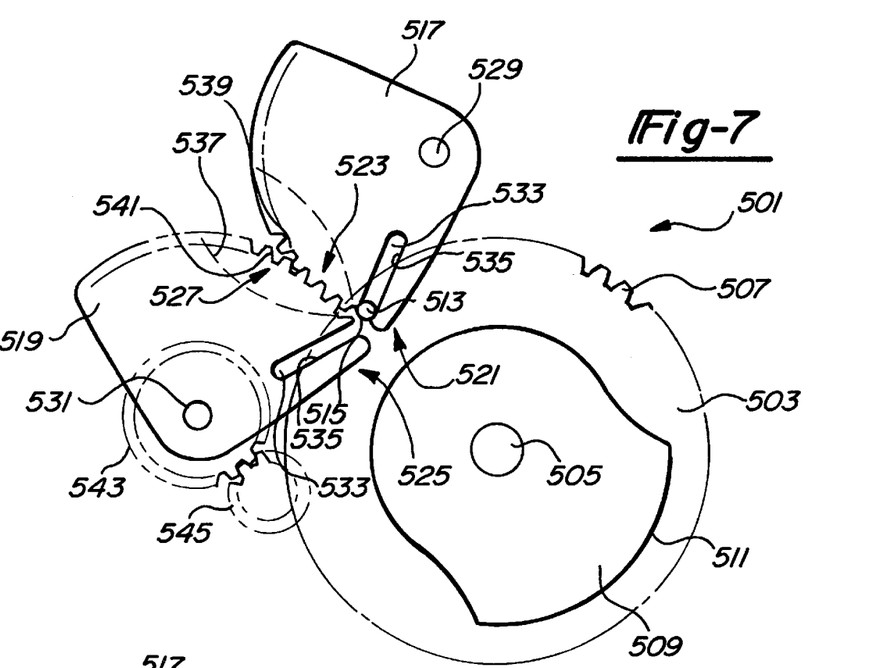
FIG. 7 is a diagrammatic rear elevational view showing a power transmission mechanism utilizing a linked double geneva mechanism for providing oscillating motion with a single unidirectional drive motor.

With reference now to FIG. 7, a fifth alternate embodiment of the multi-functional apparatus of the present invention is partially illustrated which utilizes a linked double geneva mechanism for generating oscillating motion from a unidirectional drive motor. Power transmission mechanism 501 includes helical gear 503 rotatably journalled within a gear housing on journalling pin 505 which defines a first plane of power transmission mechanism 501. Helical gear 503 has a set of helically oriented teeth 507 formed on a peripheral edge thereof for with a worm gear operably associated with a motor assembly. A drum or geneva wheel 509 is coaxially stacked on a face of helical gear 503 and defines a second plane of power transmission mechanism 501. Drum 509 has a partially circular peripheral sector 511 formed thereon. Helical gear 503 and drum 509 are coaxially aligned for rotation about journalling pin 505. Drive pin 513 projects from a face of helical gear 503 substantially parallel to journalling pin 505. Drive pin 513 has a cylindrical driving interface surface 515 thereabout.

Power transmission assembly 501 further employs an intermittent rotary motion mechanism including a pair of cams 517 and 519 supported for rotational movement about journalling pins 529, 531, respectively. Cam 517 includes a geneva portion 521 formed coplanar with drum 509 and a gear sector portion 523 coaxially stacked on geneva portion 521 for rotation therewith. Similarly, cam 519 includes a geneva portion 525 formed coplanar with drum 509 and a gear sector portion 527 coaxially stacked on geneva portion 525 for rotation therewith.

Geneva portions 521, 525 each include a single linear external open channel 533 defining a driven interfacing surface 535. Partially circular external surfaces 537 are formed on geneva portions 521, 525 of cams 517, 519 to register with partially circular peripheral sector 511 of drum 509. Thus, peripheral sector 511 cooperates with peripheral surface 537 to render cams 517, 519 non-back drivable. Sector gear portions 523, 527 include a set of gear teeth 539, 541 which enmesh to operably couple rotational movement of cam 517 with rotational movement of cam 519 for coordinated rotational movement therebetween.

Cam 519 additionally has a spur gear 543 stacked coaxially thereupon for simultaneous movement therewith. Spur gear 543 has a peripheral set of teeth extending entirely therearound for enmeshing with a mating external set of teeth extending entirely around driven pinion gear 545. A window wiper shaft is attached to pinion gear 545 through rivets, insert molding, knurled press fitting, etc. such that the rotational movement of the wiper arm is proportional to the rotational movement of cam 519 which is in turn rotatably coupled to cam 517 through teeth 539, 541 and to helical gear 503 through geneva portions 521, 525 and pin 513. While the present invention in accordance with the fifth alternate embodiment is described with a spur and pinion gear system for driving the wiper assembly, one skilled in the art will readily recognize that the wiper assembly may be directly driven from the output of cam 519 to provide an oscillating motion based on a unidirectional input from helical gear 503.

Figure 8A:
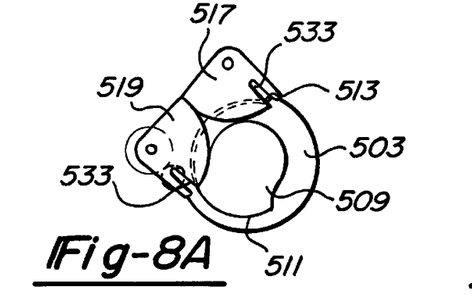
FIGS. 8A–8E are diagrammatic rear elevational views of the power transmission assembly illustrated in FIG. 7 showing the intermittent oscillating motion generated thereby.
Figure 8B:
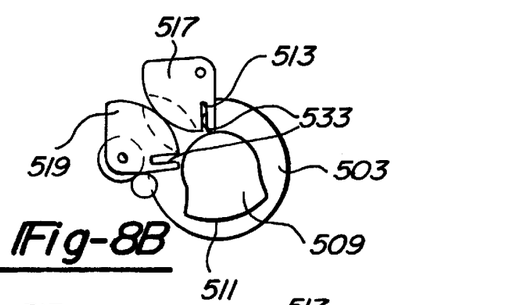

With reference now to FIGS. 8A–8E, the operation of power transmission mechanism 501 will be described. In FIG. 8A, cams 517, 519 are positioned in an opposed direction such that each channel 533 extends generally radially away from the opposing cam. Helical gear 503 is rotated in a counter-clockwise direction by a motor assembly such that pin 513 approaches cam 517. As helical gear 503 further rotates, pin 513 engages channel 533 of geneva portion 521 causing cam 517 to gradually accelerate in a clockwise direction as shown in FIG. 8B. Sector gear 523 engages sector gear 527 causing cam 519 to rotate in a counter-clockwise direction. Rotational movement of cam 519 is transferred to the wiper arm via spur gear 543 and pinion gear 545.

Figure 8C:
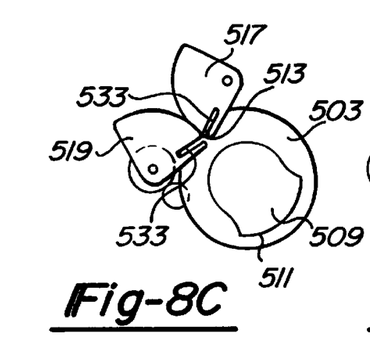
Figure 8D:
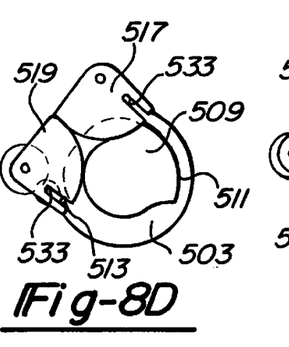
Figure 8E:
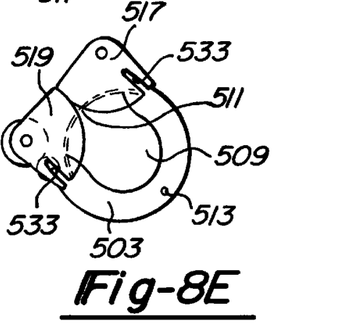

As shown in FIG. 8C, helical gear 503 further rotates in a counter-clockwise direction such that pin 513 disengages from channel 533 of cam 517 and engages channel 533 of cam 519. At this point, cams 517, 519 have momentarily stopped rotating. As pin 513 engages channel 533 of cam 519, rotation of cam 519 is initiated in a clockwise direction. As helical gear 503 further rotates in a counter-clockwise direction, pin 513 further drives cam 519 in a clockwise direction. Sector gears 527 of cam 519 engage sector gear 523 of cam 517 to rotate cam 517 in a counter-clockwise direction as best seen in FIG. 8D driving cams 517, 519 toward the position illustrated in FIG. 8A. Helical gear 503 further rotates in a counter-clockwise direction until pin 513 disengages channel 533 of cam 519. At this point, cams 517, 519 have counter-rotated to the original opposing position. Helical gear 513 further rotates in a counter-clockwise direction. During this portion of the cycle, cams 517, 519 are not driven, but instead remain stationary. Moreover, peripheral sector 511 registers with peripheral surfaces 537 to prevent rotation of cams 517, 519 as illustrated in Figure E. Pin 513 rotates with helical gear 503 to approach channel 533 of cam 517 wherein the cycle illustrated in FIGS. 8A–8E is repeated. In this manner, power transmission assembly 501 is able to provide an intermittent oscillating sinusoidal motion from a single unidirectional drive motor.

Various materials have been disclosed in an exemplary fashion, however, other materials may of course be employed. More specifically, the present invention has been illustrated and described in a discrete manner, that is each figure illustrates a single modification to the power transmission mechanism of the present invention. However, one skilled in the art should recognize that any combination of these modifications could be employed in a single power transmission mechanism. For example, cam 305 (FIG. 3) which employs a hybrid geneva/gear mechanism could be readily substitute for geneva mechanisms 521, 525 (FIGS. 7 and 8) to provide an extended range of motion. Similarly, the output linkage, the geneva extension and the dual-function geneva mechanism could be readily adapted for use in any of the power transmission mechanisms illustrated and described herein. It is intended by the following claims to cover these and any other departures from the disclosed embodiments which fall within the true spirit of this invention.

The invention claimed is:

1. A power transmission mechanism comprising:
   a rotatable member having a first driving pin, a second driving pin and a first sector gear, said first sector gear being operably located substantially between said driving pins;
   an electromagnetic device selectively rotating said rotatable member;
   an intermittent motion mechanism having a first driven channel engagable with said first driving pin, a second driven channel engagable with said second driving pin and a second sector gear engagable with said first sector gear, said second sector gear being operably located substantially between said channels.

2. The power transmission mechanism of claim 1 wherein said first and third driving pins accelerate and decelerate the angular velocity of said intermittent motion mechanism and said first sector gear drives said intermittent motion mechanism at a substantially constant angular velocity.

3. The power transmission mechanism of claim 1 wherein:
   said first driven channel further includes a substantially V-shaped surface and a first inner guide surface offset inside said V-shaped surface; and
   said second driven channel further includes a substantially V-shaped surface and a second inner guide surface offset inside said V-shaped surface.

4. The power transmission mechanism of claim 1 wherein at least one surface of said first channel is curved and said electromagnetic device is a direct current electric motor.

5. The power transmission mechanism of claim 1 further comprising:
   at least one intermediate driving pin operably disposed between said first and second driving pins; and
   said second driven channel is part of a star wheel having at least one tooth operably disposed between said first and second channels to engage said first driving pin, said second driving pin and said at least one intermediate driving pin.

6. The power transmission mechanism of claim 1 further comprising a wiper assembly including a wiper output shaft operably coupled to said intermittent motion mechanism for driving said wiper assembly through an oscillating range of motion.

7. The power transmission mechanism of claim 6 wherein said wiper assembly is a spur gear operably associated with said mechanism, a pinion gear enmeshes with said spur gear, and said wiper output is shaft operably associated with said pinion gear for simultaneous movement therewith.

8. The power transmission mechanism of claim 6 wherein one of said driving pins engages a corresponding one of said driven channels to move said wiper assembly from a parked position to an unparked position.

9. The power transmission mechanism of claim 1 further comprising:
   a second intermittent motion mechanism having a channel engagable with at least one of said driving pins; and
   a first lock release mechanism operably coupled to said second intermittent motion mechanism for movement between a locked orientation and an unlocked orientation;
   said at least one drive pin causing said second intermittent motion mechanism to rotate between a first position and a second position such that said first lock release mechanism moves between said locked orientation and said unlocked orientation.

10. The power transmission mechanism of claim 9 further comprising an output link stacked coaxially upon said second intermittent motion mechanism, said link directly coupling said first lock release mechanism to said second intermittent motion mechanism.

11. The power transmission mechanism of claim 9 further comprising:
   a third intermittent motion mechanism having a channel engagable with at least one of said driving pins for rotatably coupling said rotatable member with said third intermittent motion mechanism;
   a second lock release mechanism operably coupled to said third intermittent motion mechanism for movement between a locked orientation and an unlocked orientation; and
   said drive pin causing said third intermittent motion mechanism to rotate between a first position and a second position such that said second lock release mechanism moves between said locked orientation and said unlocked orientation.

12. The power transmission mechanism of claim 11 further comprising a second output link stacked coaxially upon said third intermittent motion mechanism, said second link directly coupling said second lock release mechanism to said third intermittent motion mechanism.

13. The power transmission mechanism of claim 1 further comprising an automotive vehicle device movably coupled to said intermittent motion mechanism.

14. A power transmission mechanism comprising:
   a rotatable member having a first driving surface, a second driving surface, a third driving surface and a fourth driving surface;
   an electromagnetic device selectively rotating said rotatable member;
   a first intermittent motion mechanism having a first driven surface engagable with said first driving surface, a second driven surface engagable with said second driving surface and a third driven surface engagable with said third driving surface;
   a second intermittent motion mechanism having a fourth driven surface engagable with said fourth driving surface to rotate said second intermittent motion mechanism;
   a first lock release mechanism operably coupled to said second intermittent motion mechanism, said fourth driving surface operably causing said second intermittent motion mechanism to rotate between a first position and a second position such that said first lock release mechanism moves between a locked orientation and an unlocked orientation.

15. The power transmission mechanism of claim 14 further comprising an output link stacked coaxially upon said second intermittent motion mechanism for simultaneous rotation therewith for directly coupling said first lock release mechanism to said second intermittent motion mechanism.

16. The power transmission mechanism of claim 14 further comprising:
   a third intermittent motion mechanism having a fifth driven surface engagable with said fourth driving surface to rotate said third intermittent motion mechanism;
   a second lock release mechanism operably coupled to said third intermittent motion mechanism and movable between a locked orientation and an unlocked orientation;

said fourth driving interface surface causing said third intermittent motion mechanism to rotate between a first position and a second position such that said second lock release mechansim moves between said locked orientation and said unlocked orientation.

17. The power transmission mechanism of claim 16 further comprising an output link stacked coaxially upon said third intermittent motion mechanism for simultaneous rotation therewith for directly coupling said second lock release mechanism to said third intermittent motion mechanism.

18. The power transmission mechanism of claim 14 further comprising a wiper assembly including a wiper output shaft operably coupled to said first intermittent motion mechanism for driving said wiper assembly over an oscillating range of motion.

19. The power transmission mechanism of claim 14 further comprising an automotive vehicle device movably coupled to said first intermittent motion mechanism.

20. A power transmission mechanism comprising:
   a rotatable member having a first driving surface and a second driving surface;
   an electromagnetic device selectively rotating said rotatable member;
   a first cam having a first driven surface engagable with said first driving surface for rotatably positioning said first cam between a first position and a second position, said first cam further having a second driven surface engagable with said second driving surface for rotatably positioning said first cam between said second position and a third position; and
   a second cam having a third driven surface, said first driving surface selectively engaging said third driven surface for rotatably coupling said rotatable member and said second cam.

21. The power transmission mechanism of claim 20 wherein:
   said rotatable member is further defined as a main gear with a set of external teeth;
   said first driving surface is further defined as a first drive pin and said second driving surface is further defined as a second drive pin, said first and second drive pins projecting substantially parallel to a rotational axis of said main gear; and
   said first driven surface is further defined as a first channel formed within said first cam, and said second driven surface is further defined as a second channel formed within said first cam.

22. The power transmission mechanism of claim 21 further comprising:
   a drum mounted on said rotatable member, said drum having a partially circular peripheral surface with a clearance indentation; and
   said cam having a partially circular external surface registering with said partially circular peripheral surface of said drum such that said first cam is substantially prevented from rotating until a portion thereof is exposed to said clearance indentation of said drum.

23. The power transmission mechanism of claim 20 further comprising a first lock release mechanism operably coupled to one of said cams for movement between a locked orientation and an unlocked orientation such that rotation of said one cam between said first position and said second position causes said first lock release mechanism to move between said locked orientation and said unlocked orientation.

24. The power transmission mechanism of claim 23 further comprising an output link stacked coaxially upon said one cam, said link directly coupling said first lock release mechanism to said one cam.

25. The power transmission mechanism of claim 23 further comprising a second lock release mechanism operably coupled to said second cam for movement between a locked orientation and an unlocked orientation such that rotation of said second cam between said second position and said third position causes said window release lock coupling member to move between said locked orientation and said unlocked orientation.

26. The power transmission mechanism of claim 25 further comprising an output link stacked coaxially upon said second cam, said link directly coupling said second lock release mechanism to said second cam.

27. The power transmission mechanism of claim 20 wherein:

said rotatable member is a main gear with a set of external teeth;

said first driving surface is a first drive pin and said second driving surface is a second drive pin, said first and second drive pins project substantially parallel to a rotational axis of said main gear;

said first driven surface is a first channel in said first cam, and said second driven surface is a second channel in said first cam; and said third driven surface is a third channel in said second cam.

28. The power transmission mechanism of claim 27 wherein said second cam has a relief formed in a peripheral edge operably receiving said first drive pin.

29. The power transmission mechanism of claim 20 further comprising a wiper assembly operably coupled to at least one of said cams.

30. The power transmission mechanism of claim 29 further comprising a spur gear operably moving with said at least one cam, a pinion gear enmeshing with said spur gear, and a wiper output shaft of said wiper assembly operably moving with said pinion gear.

31. The power transmission mechanism of claim 20 further comprising an automotive vehicle device movably coupled to said first cam.

32. A power transmission mechanism for generating intermittent oscillaing motion from a unidirectional rotating member comprising:

a rotatable member having a first driving surface;

an electromagnetic device selectively rotating said rotatable member; and an intermittent motion mechanism including a first cam having a first driven surface engagable with said first driving surface and a second cam having a second driven surface engagable with said first driving surface, said first cam being operably coupled to said second cam for coordinated rotational movement.

33. The power transmission mechanism of claim 32 wherein:

said first driving surface is further defined as a first drive pin projecting substantially parallel to a rotational axis of said rotatable member; and said first driven surface is further defined as a first channel formed within said first cam, and said second driven surface is further defined as a second channel formed within said second cam.

34. The power transmission mechanism of claim 32 further comprising:

a first sector gear coaxially stacked on said first cam for rotation therewith, said first sector gear having a first set of gear teeth formed thereon;

a second sector gear coaxialiy stacked on said second cam for rotation therewith, said second sector gear having a second set of gear teeth formed thereon;

said first and second set of gear teeth enmeshing to operably couple rotational movement of said first cam with rotational movement of said second cam.

35. The power transmission mechanism of claim 34 wherein said rotatable member is disposed within a first plane, said first and second cams are disposed within a second plane, and said first and second sector gears are disposed within a third plane.

36. The power transmission mechanism of claim 35 wherein said second plane is positioned directly adjacent said first plane and said third plane is positioned directly adjacent said second plane opposite said first plane.

37. The power transmission mechanism of claim 32 further comprising:

a drum coaxially stacked on said main gear for rotation therewith, said drum having a partially circular peripheral surface; and each of said first and second cams having a partially circular eternal surface registering with said partially circular peripheral surface of said drum such to substantially prevent each of said first and second cams from rotating.

38. The power transmission mechanism of claim 32 further comprising a wiper assembly including a wiper output shaft operably coupled to said cam for driving a wiper arm over an oscillating range of motion.

39. The power transmission mechanism of claim 38 wherein said wiper assembly is further defined by a spur gear operably associated with said cam for simultaneous movement therewith, a pinion gear enmeshing said spur gear, and said wiper output shaft operably associated with said pinion gear for simultaneous movement therewith.

40. The power transmission mechanism of claim 32 further comprising gear teeth located on said first cam engaging gear teeth located on said second cam when said cams are in a first positional range.

41. The power transmission mechanism of claim 40 wherein said gear teeth of said cams do not engage each other when said cams are in a second positional range.

42. The power transmission mechanism of claim 32 further comprising a member coupled to said cams, wherein said electromagnetic device is a direct current electric motor which is energizable in a first rotational direction to cause alternating clockwise and counterclockwise movement of said member.

43. The power transmission mechanism of claim 32 further comprising an automotive vehicle device movably coupled to said intermittent motion mechanism.

* * * * *